US012215588B2

(12) United States Patent
Singh et al.

(10) Patent No.: US 12,215,588 B2

(45) Date of Patent: Feb. 4, 2025

(54) SEAL ASSEMBLY FOR A GAS TURBINE ENGINE

(71) Applicant: General Electric Company, Schenectady, NY (US)

(72) Inventors: Tajinder Singh, Bengaluru (IN); Rajesh Kumar, Bengaluru (IN); David Raju Yamarthi, Bengaluru (IN); Bryan Jung Woo Hong, Blue Ash, OH (US); Narendra Anand Hardikar, Bengaluru (IN); Ravindra Shankar Ganiger, Bengaluru (IN); Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/190,403

(22) Filed: Mar. 27, 2023

(65) Prior Publication Data

US 2024/0328325 A1 Oct. 3, 2024

(51) Int. Cl.
*F01D 11/10* (2006.01)

(52) U.S. Cl.
CPC ........ *F01D 11/10* (2013.01); *F05D 2220/323* (2013.01); *F05D 2240/55* (2013.01)

(58) Field of Classification Search
CPC ........ F01D 11/02; F01D 11/10; F01D 11/025; F01D 11/16; F01D 25/04; F01D 11/001;
(Continued)

(56) References Cited

U.S. PATENT DOCUMENTS

| | | | |
|---|---|---|---|
| 2,970,808 | A | 2/1961 | Coppa |
| 3,146,992 | A | 9/1964 | Farrell |

(Continued)

FOREIGN PATENT DOCUMENTS

| | | | |
|---|---|---|---|
| CN | 108374694 | A | 8/2018 |
| CN | 109973658 | A | 7/2019 |

(Continued)

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.

(Continued)

*Primary Examiner* — J. Todd Newton

(74) *Attorney, Agent, or Firm* — Dority & Manning, P.A.

(57) ABSTRACT

A turbine engine includes a rotor, a stator, and a seal assembly disposed between the rotor and the stator. The seal assembly includes seal segment. The seal segment includes a seal face that is configured to form a fluid bearing with the rotor. A lift channel extends within the seal segment from an opening on the seal face. The turbine engine further includes a spring assembly disposed within the lift channel. The spring assembly including a biasing element and a piston element coupled to the biasing element. The lift channel includes a lift volume portion extending is between the opening and the piston element. The piston element is movable within the lift channel based on a pressure within the fluid bearing to adjust a size of the lift volume portion.

5 Claims, 10 Drawing Sheets

(58) Field of Classification Search
CPC ...... F01D 11/003; F01D 11/04; F01D 25/183; F05D 2220/323; F05D 2240/55; F05D 2260/38; F05D 2300/505; F05D 2240/11; F16J 15/50; F16J 15/52
USPC ......................................... 277/360, 358, 388
See application file for complete search history.

(56) References Cited

U.S. PATENT DOCUMENTS 3,511,511 A 5/1970 Voitik
4,251,185 A 2/1981 Karstensen
4,307,993 A 12/1981 Hartel
4,334,822 A 6/1982 Rossmann
4,632,635 A 12/1986 Thoman et al.
4,747,603 A 5/1988 Sugino et al.
4,856,963 A 8/1989 Klapproth et al.
4,974,821 A 12/1990 Balsells
4,983,051 A 1/1991 Hibner et al.
5,100,158 A 3/1992 Gardner
5,143,384 A 9/1992 Lipschitz
5,301,957 A 4/1994 Hwang et al.
5,388,843 A 2/1995 Sedy
5,431,533 A 7/1995 Hobbs
5,509,664 A 4/1996 Borkiewicz
5,639,210 A 6/1997 Carpenter et al.
5,975,537 A 11/1999 Turnquist et al.
6,145,843 A 11/2000 Hwang
6,202,302 B1 3/2001 Descoteaux
6,210,103 B1 4/2001 Ramsay
6,273,671 B1 8/2001 Ress, Jr.
6,368,054 B1 4/2002 Lucas
6,505,837 B1 1/2003 Heshmat
6,514,041 B1 2/2003 Matheny et al.
6,543,992 B2 4/2003 Webster
6,572,115 B1 * 6/2003 Sarshar ................ F16J 15/3288 277/412
6,655,696 B1 * 12/2003 Fang ...................... F16J 15/445 277/411
6,692,006 B2 2/2004 Holder
6,811,154 B2 11/2004 Proctor et al.
6,877,952 B2 4/2005 Wilson
6,895,757 B2 5/2005 Mitchell et al.
6,896,038 B2 5/2005 Arilla et al.
7,066,470 B2 6/2006 Turnquist et al.
7,079,957 B2 7/2006 Finnigan et al.
7,086,649 B2 8/2006 Plona
7,125,223 B2 10/2006 Turnquist et al.
7,334,980 B2 2/2008 Trinks et al.
7,367,776 B2 5/2008 Albers et al.
7,413,194 B2 * 8/2008 Wright ................ F16J 15/3288 277/579
7,435,049 B2 10/2008 Ghasripoor et al.
7,438,526 B2 10/2008 Enderby
7,448,849 B1 11/2008 Webster et al.
7,459,081 B2 12/2008 Koenig et al.
7,596,954 B2 10/2009 Penda et al.
7,614,792 B2 11/2009 Wade et al.
7,726,660 B2 6/2010 Datta
7,752,849 B2 7/2010 Webster et al.
7,901,186 B2 3/2011 Cornett et al.
8,002,285 B2 8/2011 Justak
8,047,765 B2 11/2011 Wilson et al.
8,052,380 B2 11/2011 Willett, Jr.
8,056,902 B2 11/2011 Roddis et al.
8,113,771 B2 2/2012 Turnquist et al.
8,142,141 B2 3/2012 Tesh et al.
8,177,476 B2 5/2012 Andrew et al.
8,186,945 B2 5/2012 Bhatnagar et al.
8,210,799 B1 7/2012 Rawlings
8,240,986 B1 8/2012 Ebert
8,434,766 B2 5/2013 Zeng et al.
8,556,578 B1 10/2013 Memmen et al.
8,608,427 B2 12/2013 Bock
8,641,045 B2 2/2014 Justak
8,678,742 B2 3/2014 Klingels
8,790,067 B2 7/2014 McCaffrey et al.
8,864,443 B2 10/2014 Narita et al.
8,985,938 B2 3/2015 Petty
9,045,994 B2 6/2015 Bidkar et al.
9,068,471 B2 6/2015 Klingels
9,103,223 B2 8/2015 Uehara et al.
9,115,810 B2 8/2015 Bidkar et al.
9,145,785 B2 9/2015 Bidkar et al.
9,169,741 B2 10/2015 Szwedowicz et al.
9,200,530 B2 12/2015 McCaffrey
9,255,489 B2 2/2016 DiTomasso et al.
9,255,642 B2 2/2016 Bidkar et al.
9,359,908 B2 6/2016 Bidkar et al.
9,394,801 B2 7/2016 Willett, Jr.
9,435,218 B2 9/2016 Casavant et al.
9,528,554 B2 12/2016 Moratz
9,587,746 B2 3/2017 Bidkar et al.
9,598,971 B2 3/2017 Hasnedl et al.
9,683,451 B2 6/2017 Sonokawa et al.
9,869,196 B2 1/2018 Day et al.
9,869,205 B2 1/2018 Ganiger et al.
9,890,650 B2 2/2018 Von Berg et al.
9,963,988 B2 5/2018 Swedowicz et al.
9,976,435 B2 5/2018 Borja et al.
10,041,534 B2 8/2018 Ganiger et al.
10,060,280 B2 8/2018 Crawley, Jr. et al.
10,077,782 B2 9/2018 Zhang et al.
10,100,660 B2 10/2018 Sippel et al.
10,161,259 B2 12/2018 Gibson et al.
10,184,347 B1 1/2019 D'Ambruoso
10,190,431 B2 1/2019 Bidkar et al.
10,196,980 B2 2/2019 Ganiger et al.
10,323,541 B2 6/2019 Ganiger et al.
10,344,612 B2 7/2019 Hudson et al.
10,352,455 B2 7/2019 Berard et al.
10,385,715 B2 8/2019 Wong et al.
10,415,418 B2 9/2019 McCaffrey et al.
10,415,419 B2 9/2019 Sun et al.
10,422,431 B2 9/2019 Chuong et al.
10,436,070 B2 10/2019 McCaffrey
10,443,424 B2 10/2019 McCaffrey
10,533,446 B2 1/2020 Barak et al.
10,920,593 B2 2/2021 Millier et al.
10,962,024 B2 3/2021 Nesteroff et al.
10,962,118 B2 3/2021 Duffy et al.
10,995,861 B2 5/2021 Hilbert et al.
11,047,481 B2 6/2021 Bidkar et al.
11,193,590 B2 12/2021 Black
2001/0007632 A1 7/2001 Pesek et al.
2003/0102630 A1 * 6/2003 Dinc ...................... F16J 15/445 277/355
2004/0100035 A1 * 5/2004 Turnquist ............... F16J 15/445 277/412
2007/0053772 A1 3/2007 Couture, Jr. et al.
2008/0056895 A1 3/2008 Senoo
2008/0265513 A1 10/2008 Justak
2010/0078893 A1 * 4/2010 Turnquist ............... F16J 15/445 277/303
2012/0177484 A1 7/2012 Lusted et al.
2012/0211944 A1 * 8/2012 Nishimoto ............. F16J 15/442 277/422
2012/0223483 A1 9/2012 Bidkar et al.
2012/0248704 A1 * 10/2012 Fennell ................... F01D 11/10 277/358
2013/0034423 A1 2/2013 Adaickalasamy et al.
2014/0008871 A1 1/2014 Bidkar et al.
2014/0062024 A1 3/2014 Bidkar et al.
2014/0117624 A1 5/2014 Bidkar et al.
2014/0119912 A1 5/2014 Bidkar et al.
2015/0044024 A1 * 2/2015 Donnelly .............. F01D 11/025 415/36
2015/0159498 A1 6/2015 Mukhopadhyay et al.
2016/0010480 A1 1/2016 Bidkar et al.
2016/0097291 A1 4/2016 Hayford et al.
2016/0130963 A1 5/2016 Wilson et al.
2016/0138412 A1 5/2016 Rioux
2016/0376907 A1 12/2016 O'Leary et al.
2017/0051621 A1 2/2017 Ackermann et al.

(56) References Cited

U.S. PATENT DOCUMENTS

| | | | |
|---|---|---|---|
| 2017/0051834 | A1 | 2/2017 | Webster et al. |
| 2017/0211402 | A1 | 7/2017 | Peters et al. |
| 2018/0045066 | A1 | 2/2018 | Chuong |
| 2018/0058240 | A1 | 3/2018 | Chuong et al. |
| 2018/0372229 | A1 | 12/2018 | Bidkar et al. |
| 2019/0072186 | A1 | 3/2019 | Bidkar et al. |
| 2019/0085712 | A1 | 3/2019 | Wesling et al. |
| 2019/0203842 | A1 | 7/2019 | Bidkar et al. |
| 2019/0218926 | A1 | 7/2019 | DiFrancesco et al. |
| 2019/0276851 | A1 | 9/2019 | Lin |
| 2020/0040735 | A1 | 2/2020 | Millier et al. |
| 2020/0063588 | A1 | 2/2020 | Morliere et al. |
| 2020/0102845 | A1 | 4/2020 | DiFrancesco et al. |
| 2020/0191162 | A1 | 6/2020 | Weihard et al. |
| 2020/0318489 | A1 | 10/2020 | Webb |
| 2020/0362716 | A1 | 11/2020 | Glahn et al. |
| 2021/0207487 | A1 | 7/2021 | George et al. |
| 2022/0154580 | A1 | 5/2022 | Gainger et al. |
| 2022/0235667 | A1 | 7/2022 | Mizumi et al. |
| 2022/0349475 | A1 | 11/2022 | Nguyen et al. |

FOREIGN PATENT DOCUMENTS

| | | | |
|---|---|---|---|
| CN | 113446069 | A | 9/2021 |
| DE | 4011710 | A1 | 10/1991 |
| EP | 2239423 | A1 | 10/2010 |
| FR | 3042555 | A1 | 4/2017 |
| FR | 3059041 | B1 | 5/2020 |
| JP | S57195803 | A | 12/1982 |
| JP | S58206807 | A | 12/1983 |
| JP | S60111004 | A | 6/1985 |
| WO | WO2010/112421 | A1 | 10/2010 |

OTHER PUBLICATIONS

Chupp et al., Sealing in Turbomachinery, NASA/TM-2006-214341, National Aeronautics and Space Administration, Cleveland, OH, 2006, 62 Pages.

Delgado et al., A Review of Engine Seal Performance and Requirements for Current and Future Army Engine Platforms, NASA/TM-2008-215161, 43rd Joint Propulsion Conference Co-Sponsored by AIAA, ASME, SAE, and ASEE, Cincinnati, OH, Jul. 8-11, 2007, 22 Pages.

Grondahl et al., Film Riding Leaf Seals for Improved Shaft Sealing, Proceeding of ASME Turbo Expo 2010: Power for Land, Sea and Air, GT2010-23629, Glasgow, UK, Jun. 14-18, 2010, 8 Pages.

Hamidizadeh, Study of Magnetic Properties and Demagnetization Models of Permanent Magnet for Electric Vehicles Application, Thesis McGill University, 2016, 84 Pages. https://escholarship.mcgill.ca/downloads/qb98mj16r.pdf.

Moore, Lip Seal, Materials Science, Fluoroelastomers Handbook 2006, 16 Pages. Retrieved Dec. 9, 2022 from Weblink https://www.sciencedirect.com/topics/materials-science/lip-seal.

Munson et al., Development of Film Riding Face Seals for a Gast Turbine Engine, Tribology Transactions, vol. 35, Issue 1, 1992, pp. 65-70.

Steinetz et al., Advanced Seal Technology Role in Meeting Next Generation Turbine Engine Goals, RTO AVT Symposium on Design Principles and Methods for Aircraft Gas Turbine Engines, Toulouse, France, May 11-15, 1998, 14 Pages.

* cited by examiner

SEAL ASSEMBLY FOR A GAS TURBINE ENGINE

FIELD

The present disclosure relates to a seal assembly for a turbine engine having wear preventative structures.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
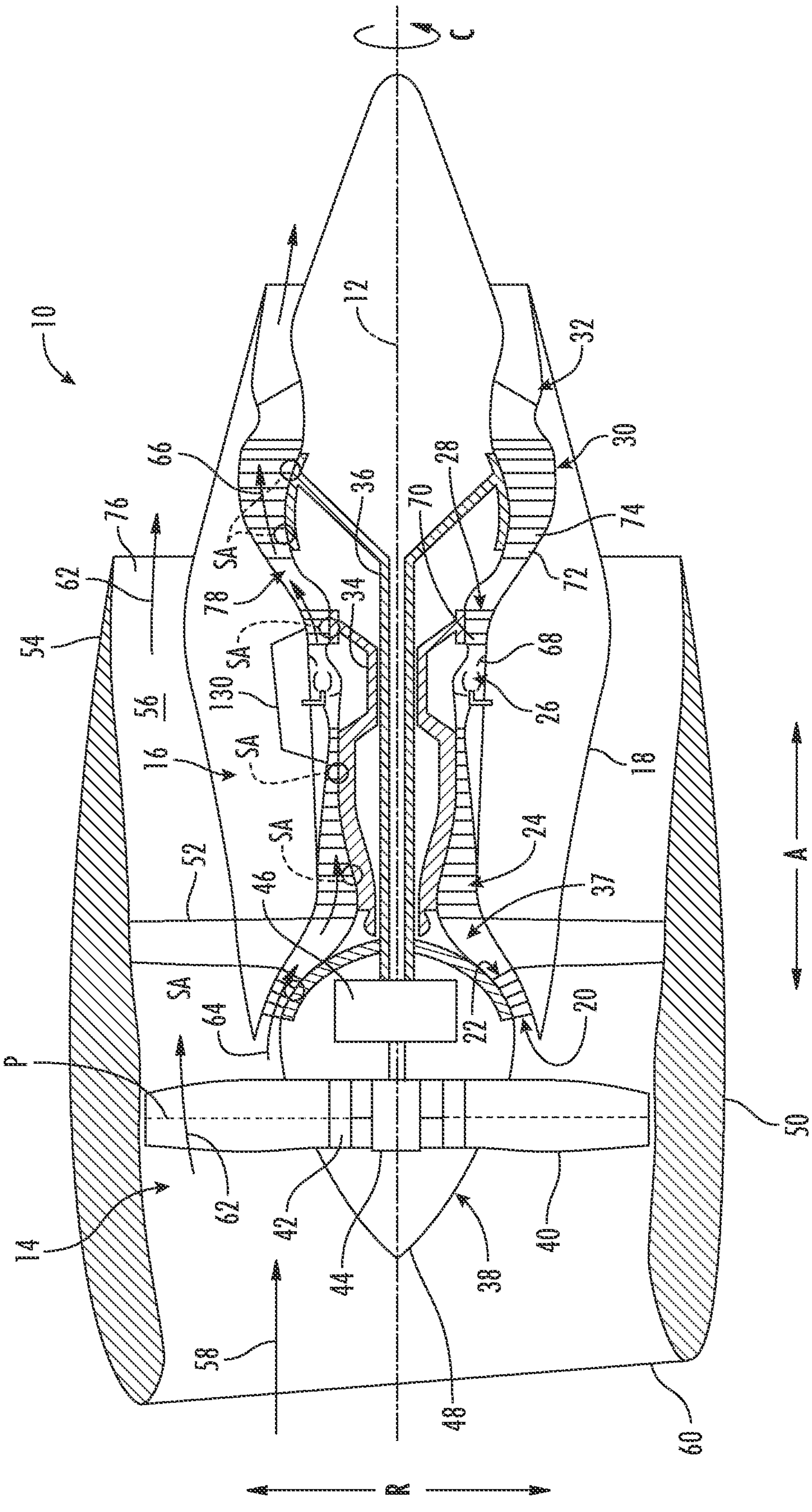
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section includes an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The term “biasing element” refers to an object that is configured to deform elastically and store mechanical energy as a result of such deformation. A biasing element may be configured to deform linearly through extension or compression, which is referred to herein as a “linear spring”; may be configured to deform in a twisting manner through rotation about its axis, which is referred to herein as a “torsional spring”; or in any other suitable manner.

The present disclosure is generally related to a seal member support system for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes.

During operation, it is desirable to control (reduce or prevent) compressed air flow or combustion gas flow leakage through these radial gaps. Ring seals are used to form a film bearing seal to seal these radial gaps. Ring seals generally include a plurality of seal shoe or seal member segments. As pressure builds in the compressor section and/or the turbine section, the seal members are forced radially outwardly and form a bearing seal between the outer surface of the rotor shaft and the respective seal members. To reduce wear on the rotor shaft and/or the seal members, it is desirable to maintain a positive radial clearance between the seal members and the outer surface of the rotor shaft under all operating conditions of the turbomachine. However, at low delta pressure operating conditions and transients like during start-up, stall, rotor vibration events, or during sudden pressure surges within the turbomachine, the film bearing stiffness may be low or suddenly change thus leading to seal member/rotor rubs.

Disclosed herein is a lift system having a lift channel defined in the seal member into which pressurized air flows to create lift on the seal. The amount of lift created on the seal is proportional to the volume of the lift channel. A biasing element (such as a mechanical spring, helical spring, or other type of biasing element) may be disposed within the lift channel, and a plate or ball may be coupled to an end of the biasing element. The biasing element may expand/retract due to pressure differences across the plate or ball, thereby varying the volume of the lift channel and adjusting the lift force on the seal member. For example, as the gap between the rotor and the stator reduces, the pressure within the gap will increase, which causes the plate move in radial outward direction and thus increasing the volume of the lift channel. In turn, more air is forced into the lift channel which creates a greater lift force on the seal member that prevents seal member/rotor rubs. This may advantageously prolong the hardware life of the seal members.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a “turbofan engine.” As shown in FIG. 1, the gas turbine engine 10 defines an axial direction A (extending parallel to a longitudinal centerline 12 provided for reference), a radial direction R. and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-: pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a “spinner”). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 is unducted gas turbine engine (such that the fan 38 is an unducted fan, and the outlet guide vanes 52 are cantilevered from, e.g., the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 is additionally or alternatively configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
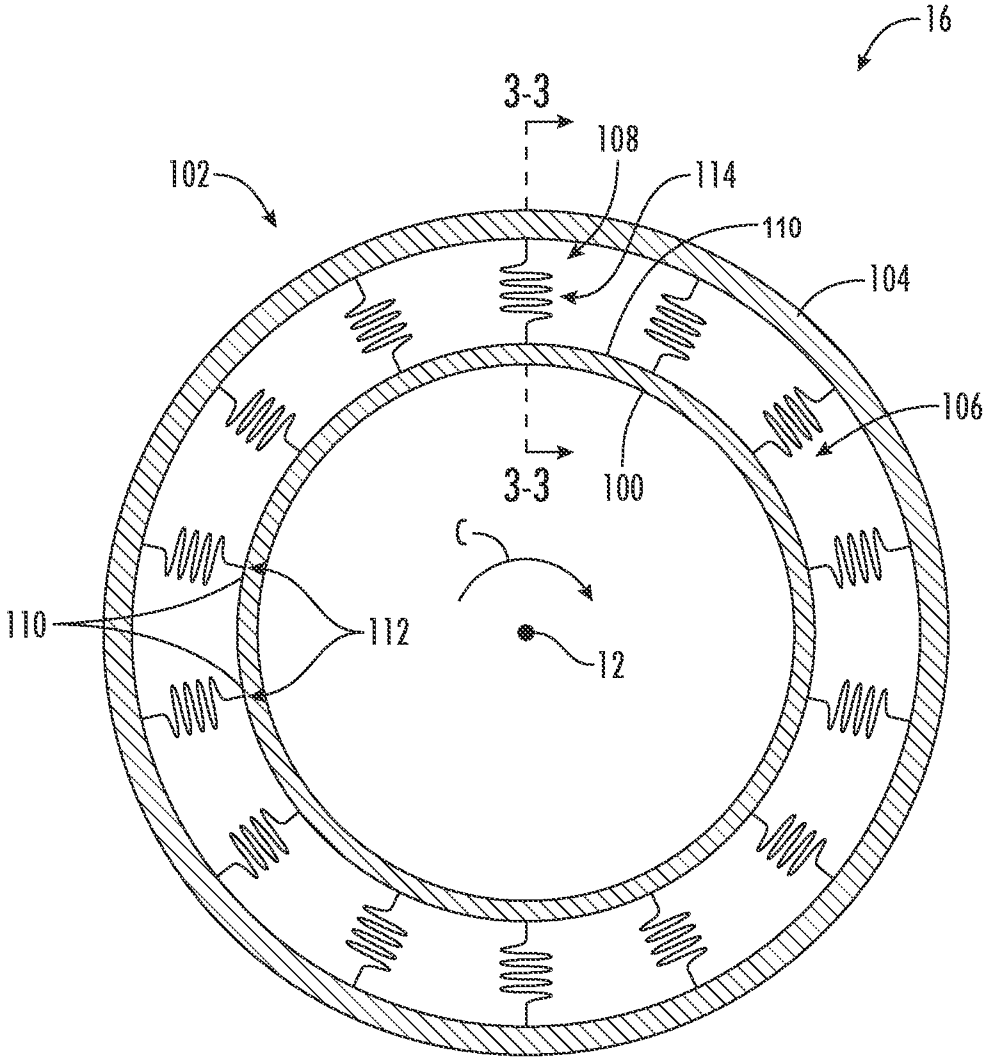
FIG. 2 is a cross sectional, schematic view of a portion of the turbomachine of FIG. 1, in accordance with embodiments of the present disclosure.

Referring now to FIG. 2, a cross sectional, schematic view of a portion of the turbomachine 16 of FIG. 1 is provided. As will be appreciated, the exemplary turbomachine 16 generally includes a rotor 100, a stator 102 having a carrier 104, a seal assembly 106 disposed between the rotor 100 and the stator 102, and a seal support assembly 108. The rotor 100 may be any rotor of the turbomachine 16, such as the LP shaft 36, the HP shaft 34, etc. By way of example, referring briefly back to FIG. 1, Circles SA have been added to FIG. 1 to provide example locations that the seal assembly 106 and seal support assembly 108 of the present disclosure may be incorporated into a turbomachine of the present disclosure. However, other locations are contemplated and included within the scope of the present disclosure.

Referring still to FIG. 2, and as will be explained in more detail below, the exemplary seal assembly 106 includes a plurality of seal segments 110 arranged along the circumferential direction C. Each seal segment 110 of the plurality of seal segments 110 has a seal face 112 configured to form a fluid bearing with the rotor 100, and more specifically a radial fluid bearing (i.e., configured to constrain the rotor 100 along the radial direction R).

As will also be explained in more detail below, the seal support assembly 108 includes a spring arrangement 114 extending between the carrier 104 and a seal segment 110 of the plurality of seal segments 110 to support the plurality of seal segments 110 of the seal assembly 106. The seal support assembly 108 may further include similar spring arrangements 114 extending between the carrier 104 and the other seal segments 110 of the plurality of seal segments 110.

Figure 3:
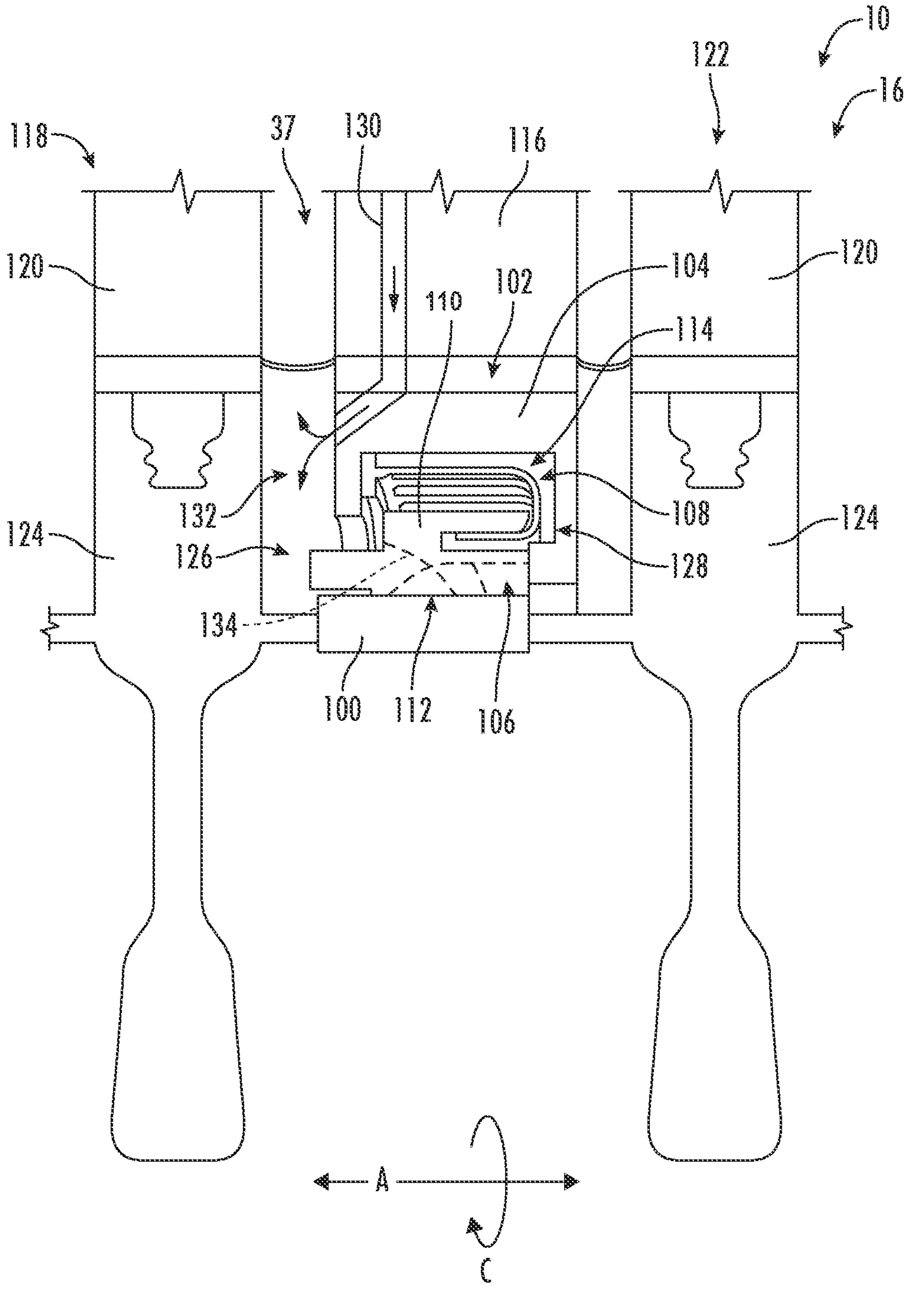
FIG. 3 is a close-up, schematic, cross-sectional view of a portion of the turbomachine of FIG. 2, taken along Line 3-3 and FIG. 2, in accordance with embodiments of the present disclosure.

Further, referring now to FIG. 3, a close-up, schematic, cross-sectional view is depicted, taken along Line 3-3 and FIG. 2. In particular, FIG. 3 depicts the seal segment 110 of the plurality of seal segments 110 positioned between the rotor 100 and the carrier 104 of the stator 102.

As will be appreciated, the stator 102 further includes a stator vane 116 and the seal assembly 106, in the embodiment depicted, is positioned at an inner end of a stator vane 116 along the radial direction R of the turbomachine 16. The turbomachine 16 further includes a first stage 118 of rotor blades 120 and a second stage 122 of rotor blades 120 spaced along the axial direction A of the gas turbine engine 10. The seal assembly 106 is positioned between the first stage 118 of rotor blades 120 and the second stage 122 of rotor blades 120 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the embodiment affected, the rotor 100 is a connector extending between a disk 124 of the first stage 118 of rotor blades 120 and a disk 124 of the second stage of rotor blades 120.

It will further be appreciated that the seal assembly 106 defines a high-pressure side 126 and a low-pressure side 128. The high-pressure side 126 may be forward of the low-pressure side 128. The seal assembly 106 is operable to prevent or minimize an airflow from the high-pressure side 126 to the low-pressure side 128 between the rotor 100 and the seal assembly 106. In particular, it will be appreciated that the seal segment 110 depicted includes the seal face 112 configured to form a fluid bearing with the rotor 100 to support the rotor 100 along the radial direction R and prevent or minimize the airflow from the high-pressure side 126 to the low-pressure side 128 between the rotor 100 and the seal assembly 106.

As will be appreciated, the seal segment 110 may be in fluid communication with a high-pressure air source to provide a high-pressure fluid flow to the seal face 112 to form the fluid bearing with the rotor 100. In at least certain exemplary aspects, the high-pressure air source may be the working gas flowpath 37 through the gas turbine engine 10 and the seal assembly 106, and more specifically the seal segment 110, may be in fluid communication with the high-pressure air source, e.g., at the high-pressure side 126 of the seal assembly 106.

In particular, for the embodiment depicted, referring back briefly also to FIG. 1, the gas turbine engine 10 further includes a high-pressure air duct 130 extending from the high-pressure air source and in fluid communication with seal assembly 106. As noted, the high-pressure air source is the working gas flowpath 37, and more specifically is a portion of the working gas flowpath defined by the HP compressor 24 of the compressor section (see FIG. 1). The high-pressure air duct 130 extends to and through the stator vane 116 and to a high-pressure cavity 132 defined at the high-pressure side 126 of the seal assembly 106 (e.g., between the stator 102 and the rotor 100). A high-pressure airflow from the high-pressure air duct 130 may pressurize the high-pressure cavity 132 to prevent gasses from the working gas flowpath 37 (which may be combustion gasses) from entering the high-pressure cavity 132 and damaging one or more components exposed thereto. The high-pressure airflow may also feed the seal assembly 106. For example, the exemplary seal segment 110 defines a plurality of air ducts 134 extending therethrough, extending between one or more inlets in airflow communication with the high-pressure cavity 132 and one or more outlets in airflow communication with the seal face 112 to provide a necessary high-pressure airflow to form the fluid bearing with the rotor 100.

It will be appreciated, however, that in other exemplary embodiments, the seal assembly 106 is integrated into, e.g., a compressor section of the gas turbine engine 10. In such a case, the high-pressure side 126 may be positioned on a downstream side or aft side of seal assembly 106, and the low-pressure side 128 may be positioned on an upstream side forward side of the seal assembly 106.

Figure 4:
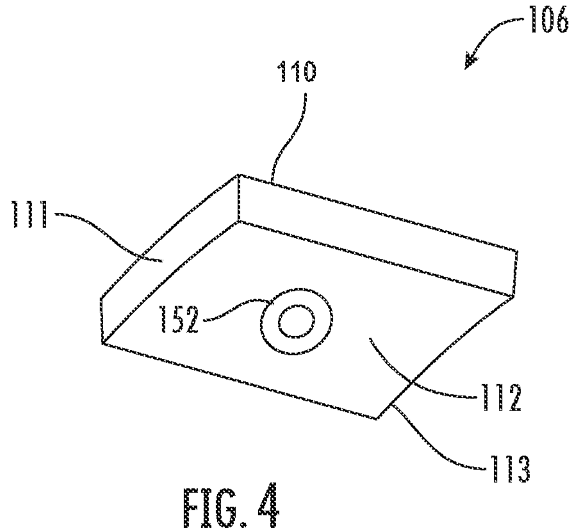
FIG. 4 is an enlarged perspective view of a portion of a seal assembly in accordance with embodiments of the present disclosure.

Referring now to FIG. 4, an enlarged perspective view of a portion of a seal assembly 106 is illustrated in accordance with embodiments of the present disclosure. The seal assembly 106 includes the seal segment 110. The seal segment 110 defines a seal face 112 configured to form a fluid bearing with the rotor 100 (FIG. 3), and more specifically a radial fluid bearing (i.e., configured to constrain the rotor 100 along the radial direction R). The seal segment 110 may define one or more lift channels 150 having an opening 152 on the seal face 112. In some embodiments, the opening 152 is generally centered on the seal face 112. In other embodiments, the opening 152 may be closer to a forward end 111 of the seal face 112 than an aft end 113 of the seal face 112. In yet still further embodiments, the opening 152 is closer to the aft end 113 of the seal face 112 than the forward end 111 of the seal face 112.

FIGS. 5 through 8 each illustrate enlarged cross-sectional view of the gas turbine engine 10 in accordance with embodiments of the present disclosure. As shown, the gas turbine engine 10 includes a rotor 100, a stator 102 having a carrier 104, a seal assembly 106 disposed between the rotor 100 and the stator 102. The seal assembly 106 includes a seal segment 110 (e.g., the seal segment 110 of the plurality of seal segments 110 shown in FIGS. 2 and 4). The seal segment 110 include a seal face 112 configured to form a fluid bearing with the rotor 100. For example, a radial gap 165 may be defined between the seal face 112 and a radially outer surface 166 of the rotor 100, and the fluid bearing may be disposed within the radial gap 165.

Additionally, the seal segment 110 defines a lift channel 150 that extends within the seal segment 110 from an opening on the seal face 112. A spring assembly 154 may be disposed within the lift channel 150, and the spring assembly 154 may include a biasing element 156 and a piston element 158. The biasing element 156 (e.g., a mechanical spring, helical spring, or other spring) may be coupled to the seal segment 110 at a first end and coupled to the piston element 158 at the second end. The lift channel 150 may include a lift volume portion 160 extending between the opening and the piston element 158. Pressurized fluid from the fluid bearing may flow into the lift volume portion 160 during the operation of the gas turbine engine 10, which creates a radially outward lift force on the seal segment 110 to force the seal segment 110 radially outward into sealing engagement with the carrier 104. The magnitude of the radially outward lift force generated by pressurized air flowing into the lift volume portion 160 is proportional to the size of the lift volume portion 160.

In many embodiments, the piston element 158 is a flat plate. For example, the piston element 158 may be shaped as a cylinder having a radially outer surface, a radially inner surface, and an annular side surface. The piston element may define a diameter that is larger than a diameter of the opening 152 and smaller than a diameter of the lift channel 150. In other embodiments (not shown), the piston element 158 is a ball bearing (e.g., a spherical ball bearing).

The piston element 158 may be movable (e.g., radially movable) within the lift channel 150 based on a pressure within the fluid bearing to compress (FIGS. 5 and 6) or extend (FIGS. 7 and 8) the biasing element 156, thereby adjusting the size of the lift volume portion 160, which in turn adjusts a magnitude of the lift force generated by pressurized fluid flowing into the lift volume portion 160. For example, as the radial gap 165 between the rotor 100 and the seal face 112 reduces, the pressure within the fluid bearing will increase, which causes the piston element 158 and the biasing element 156 to move in a radial outward direction, thereby increasing the size of the lift volume portion 160, which in turn increases a magnitude of the radially outward lift force. This may cause the seal segment 110 (and/or the entire seal assembly 106) to move radially outwardly, which may advantageously prevent or reduce contact between the seal face 112 and the rotor 100 that would otherwise cause wear and/or damage to the seal face 112.

By contrast, as the radial gap 165 between the rotor 100 and the seal face 112 increases, the pressure within the fluid bearing will decrease, which will cause the piston element 158 and the biasing element 156 to move in in a radial inward direction, thereby decreasing the size of the lift volume portion 160, which in turn decreases the magnitude of the radially outward lift force. This may cause the seal segment 110 (and/or the entire seal assembly 106) to move radially inwardly without contacting the rotor 100, which may advantageously maintain a desired length of the radial gap 165.

In many embodiments, each seal segment 110 includes a forward surface 168, an aft surface 170, a radially outer surface 173 and a seal face 112 (or radially inner surface).

The forward surface 168 may be disposed on the high-pressure side 126, and the aft surface 170 may be disposed on the low-pressure side 128. In exemplary embodiments, a feeding port 172 is defined within each seal segment 110 (including the seal segment 110). The feeding port 172 may extend from the high-pressure side 126 of the seal segment 110. Particularly, the feeding port 172 may extend from an inlet on the forward surface 168 to the lift channel 150.

In many embodiments, the lift channel 150 extends between a radially inner surface 174 and an annular side surface 176. For example, the lift channel 150 may be generally shaped as a cylinder, which may be collectively bound by the radially inner surface 174 and the annular side surface 176. The lift channel 150 may extend radially from a first end 190 fluidly connected to the feeding port 172 to a second end 192 at the radially inner surface 174. The lift channel 150 may be fluidly coupled to the fluid bearing via the opening 152. The opening 152 may extend radially between the radially inner surface 174 of the lift channel 150 and the seal face 112. In some embodiments, as shown, the opening 152 has a smaller diameter than the lift channel 150. In other words, the lift channel 150 may define a first diameter, and the opening may define a second diameter. The second diameter may be smaller than the first diameter.

Figure 5:
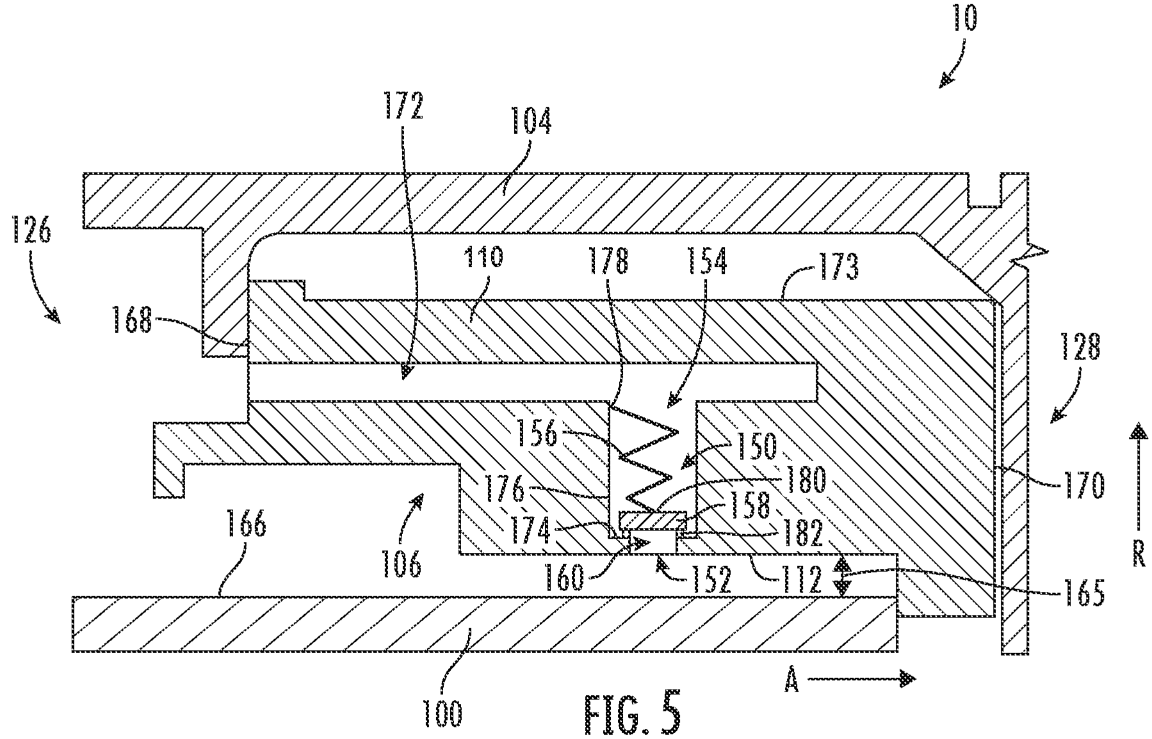
FIG. 5 illustrates an enlarged cross-sectional view of the turbine engine, in which a spring assembly is in a pre-extended position, in accordance with embodiments of the present disclosure.
Figure 6:
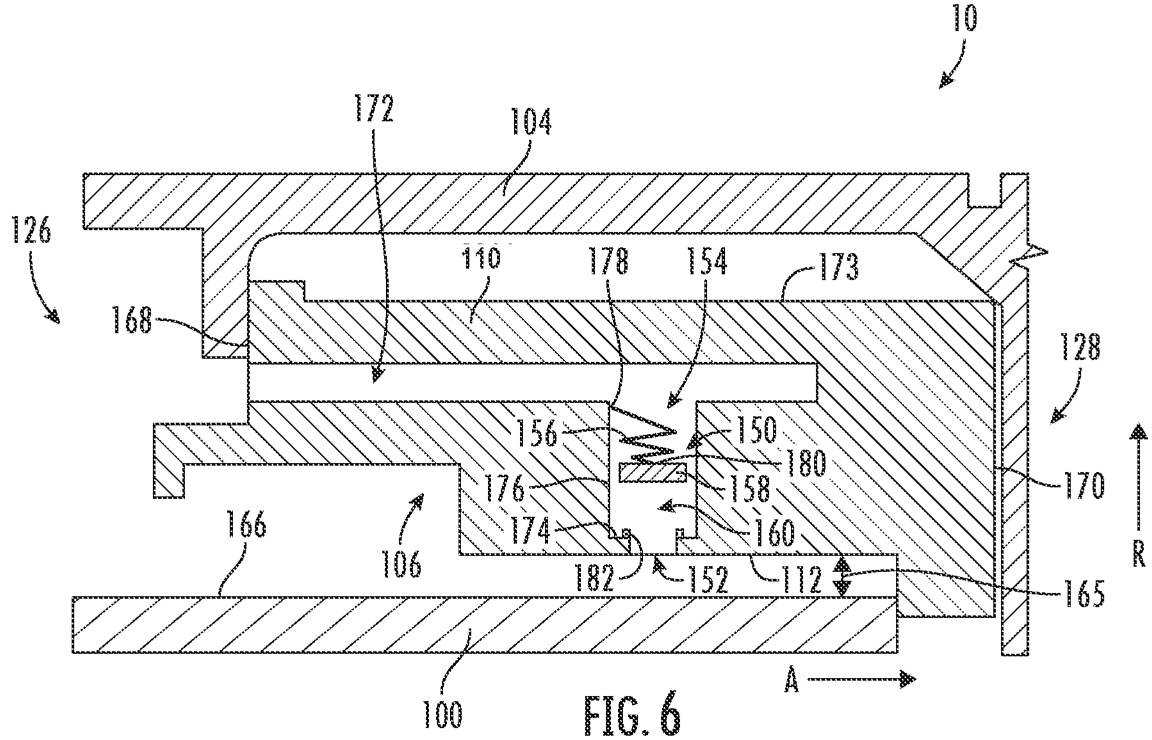
FIG. 6 illustrates an enlarged cross-sectional view of the turbine engine of FIG. 5, in which the spring assembly is in a retracted position, in accordance with embodiments of the present disclosure.

In some embodiments, as shown in FIGS. 5 and 6, the biasing element 156 extends between a first end 178 coupled to the annular side surface 176 to a second end 180 coupled to the piston element 158 (e.g., coupled to a radially outer surface 186 of the piston element 158). In such embodiments, as shown, the biasing element 156 is in a pre-expanded position (i.e., positively displaced from an equilibrium position), such that increases in pressure within the fluid bearing cause a reduction in the displacement of the biasing element (i.e., causing the piston element 158 to move radially outward). Stated otherwise, in FIG. 5, the high-pressure fluid on the high-pressure side 126 may impart a radially inward force on the piston element 158, which keeps the biasing element in an expanded position against the opening 152 (or against the stoppers 182) when the radial gap 165 is large. By contrast, in FIG. 6, when the radial gap 165 is small, the pressure within the fluid bearing increases, which imparts a radially outward force on the piston element 158, which moves the piston element 158 radially outward within the lift channel 150. Movement of the piston element 158 increases the size of the lift volume portion 160, which in turn increases the radially outward force on the seal assembly 106, thereby moving the seal segment 110 radially outward to prevent wear between the seal face 112 and the rotor 100. In this way, the piston element 158 may be actuated by the competing radial forced imparted on the piston element 158 by the high-pressure fluid on the high-pressure side 126 and the fluid in the fluid bearing. The piston element 158 may include a radially outer surface 186 and a radially inner surface 188.

Figure 7:
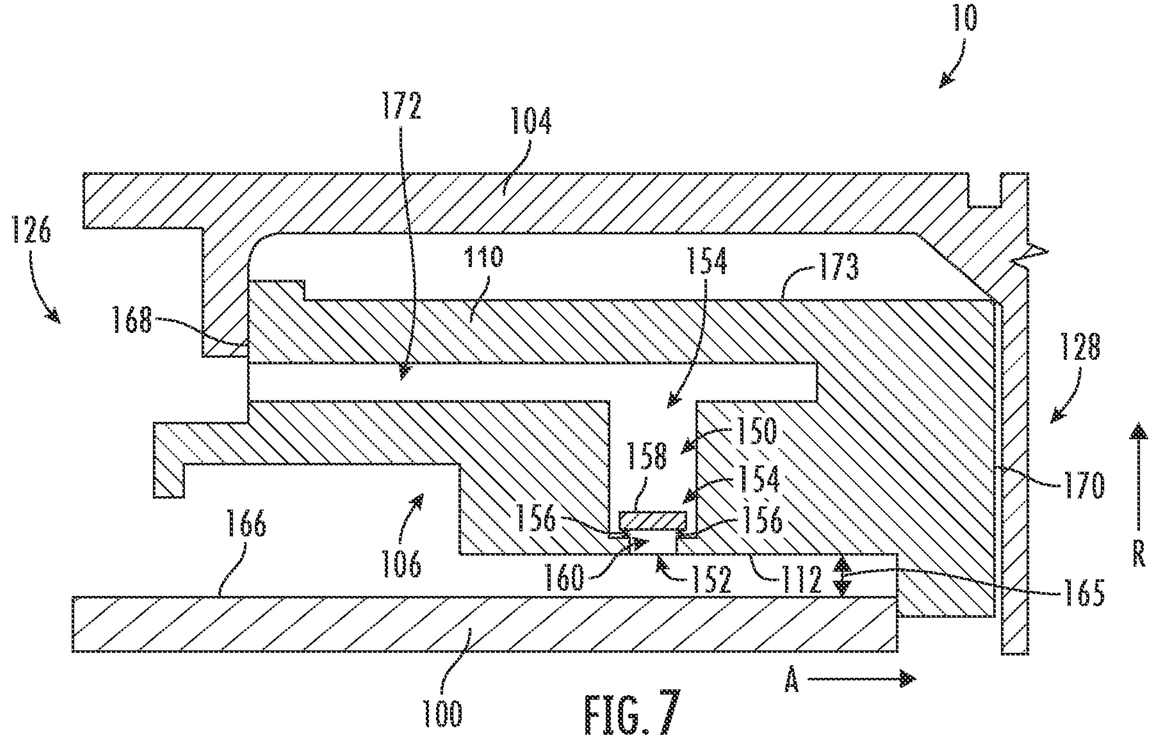
FIG. 7 illustrates an enlarged cross-sectional view of the turbine engine, in which a spring assembly is in a pre-compressed position, in accordance with embodiments of the present disclosure.
Figure 8:
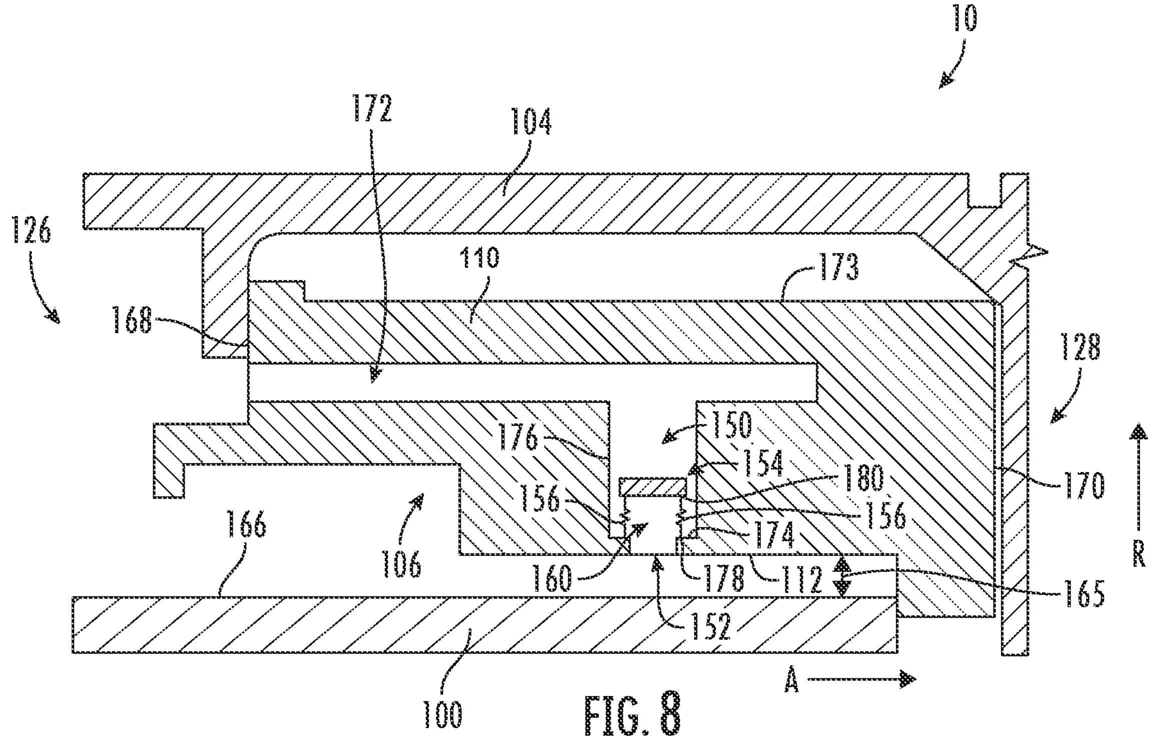
FIG. 8 illustrates an enlarged cross-sectional view of the turbine engine of FIG. 7, in which the spring assembly is in an extended position, in accordance with embodiments of the present disclosure.

In other embodiments, as shown in FIGS. 7 and 8, the biasing element(s) 156 extend between a first end 178 coupled to the radially inner surface 174 to a second end 180 coupled to the piston element 158 (e.g., coupled to a radially inner surface 188 of the piston element 158). In such embodiments, as shown, the biasing element(s) 156 are in a pre-compressed position (i.e., negatively displaced from an equilibrium position), such that increases in pressure within the fluid bearing cause an increase in the displacement of the biasing element 156 (i.e., causing the piston element 158 to move radially outward). Stated otherwise, in FIG. 7, the high-pressure fluid on the high-pressure side 126 may impart a radially inward force on the piston element 158, which keeps the biasing element in a compressed position against the opening 152 (or against the stoppers 182) when the radial gap 165 is large. By contrast, in FIG. 8, when the radial gap 165 is small, the pressure within the fluid bearing increases, which imparts a radially outward force on the piston element 158, which moves the piston element 158 radially outward within the lift channel 150 and extends the biasing element(s) 156. Movement of the piston element 158 radially outward increases the size of the lift volume portion 160, which in turn increases the radially outward force on the seal assembly 106, thereby moving the seal segment 110 radially outward to prevent wear between the seal face 112 and the rotor 100. In this way, the piston element 158 may be actuated (e.g., radially actuated) by the competing radial forced imparted on the piston element 158 by the high-pressure fluid on the high-pressure side 126 and the fluid in the fluid bearing.

The movement of the piston element may be described by the following equations:

$$P_{high}A = P_{FB}A + F_{spring} \quad (1)$$

$$F_{spring} = -kx \quad (2)$$

Where $P_{high}$ is the pressure of the fluid in the high-pressure side 126, A is the area of the piston element 158, $P_{FB}$ is the pressure of the fluid in the fluid bearing, and $F_{spring}$ is the spring force. Additionally, k is the spring constant of the biasing element and x is the displacement (e.g., in the radial direction) of the biasing element from its equilibrium position. Accordingly, in operational instances where the radial gap 165 is small, $P_{FB}$ will increase, and $P_{high}$ will remain constant. Thus, $F_{spring}$ may go down when the radial gap 165 is small (e.g., x may go down).

In exemplary embodiments, the lift channel 150 extends (e.g., generally radially) from the first end 190 at the feeding port 172 to the second end 192 at the opening 152. That is, the lift channel 150 may be fluidly coupled to the feeding port 172, which may advantageously regulate the pressure within the feeding port 172 to actuate the piston element 158. In many embodiments, the lift channel 150 is disposed axially between the forward surface 168 and the aft surface 170. In some embodiments, the lift channel 150 is disposed axially closer to the forward surface 168 (and/or the high-pressure side 126) than the aft surface 170 (and/or the low-pressure side 128). In other embodiments, the lift channel 150 is disposed axially closer to the aft surface 170 (and/or the low-pressure side 128) than the forward surface 168 (and/or the high-pressure side 126).

Figure 10:
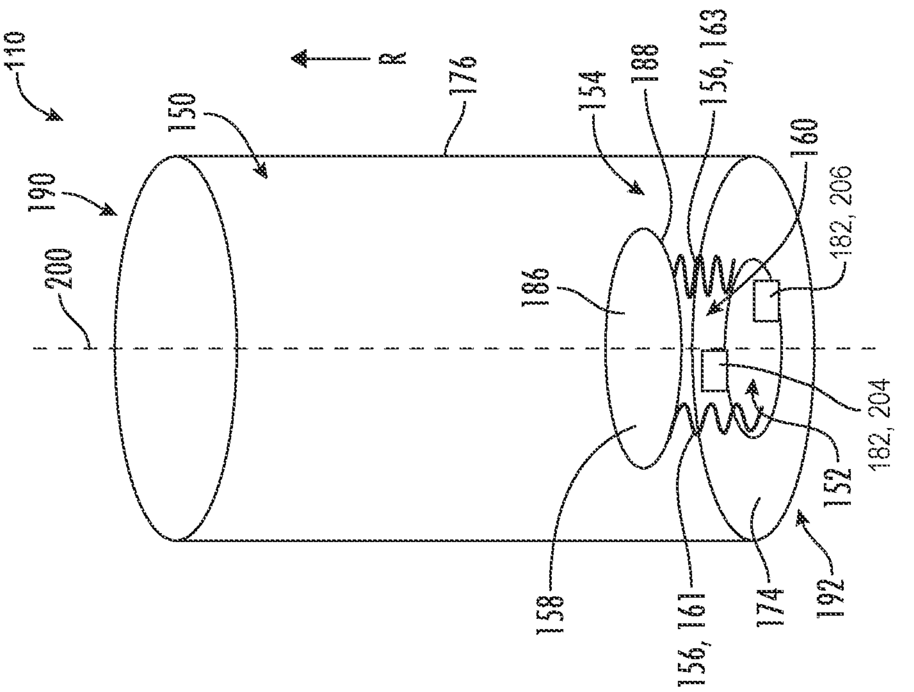
FIG. 10 illustrates an enlarged, partial cross-sectional, perspective view of the seal assembly shown in FIGS. 7 and 8, in which a portion of the annular side surface has been omitted to show the elements of a lift channel and a spring assembly, in accordance with embodiments of the present disclosure.
Figure 9:
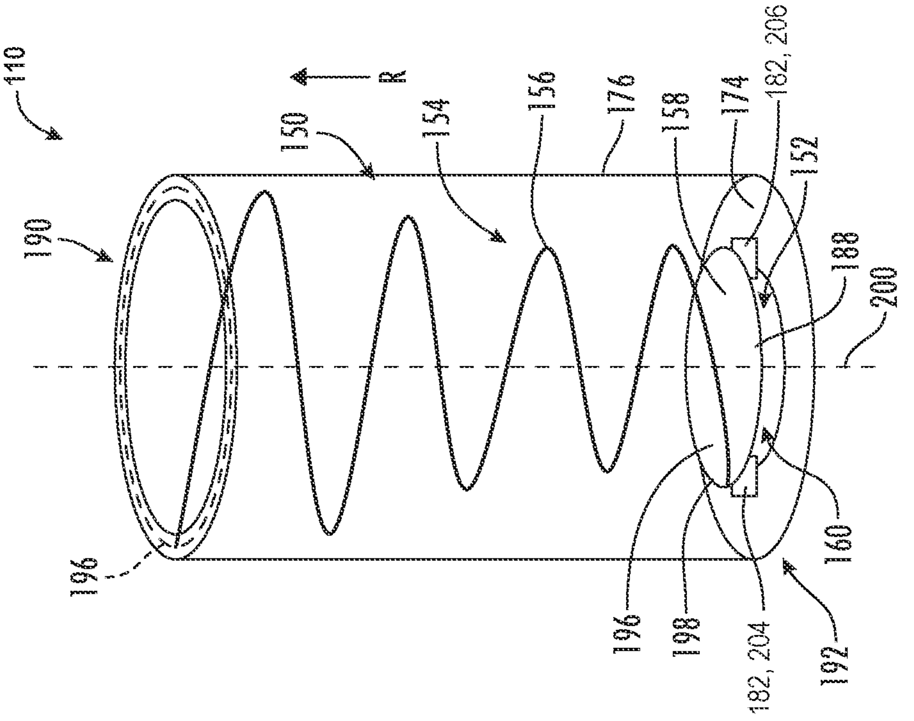
FIG. 9 illustrates an enlarged, partial cross-sectional, perspective view of the seal assembly shown in FIGS. 5 and 6, in which a portion of the annular side surface has been omitted to show the elements of a lift channel and a spring assembly, in accordance with embodiments of the present disclosure.

FIGS. 9 and 10 each illustrate an enlarged, partial cross-sectional, perspective view of a seal assembly 106, in which a portion of the annular side surface 176 has been omitted to show the elements of the lift channel 150 and the spring assembly 154, in accordance with embodiments of the present disclosure. Particularly, FIG. 9 corresponds with the embodiments of the seal assembly 106 shown and described above with reference to FIGS. 5 and 6, and FIG. 10 corresponds with the embodiments of the seal assembly 106 shown and described above with reference to FIGS. 7 and 8. As shown, the lift channel 150 may be generally cylindrically shaped and may extend radially along a centerline 200 from a first end 190 to a second end 192 at the radially inner surface 174. The centerline 200 may be aligned with the radial direction R of the gas turbine engine 10. The opening 152 may be defined at least partially by the radially inner surface 174 at the second end 192. In many embodiments, as shown, the opening 152 is centered on the centerline 200 of the lift channel 150 (i.e., a center point of the opening 152 is disposed on the centerline of the lift channel 150). In various embodiments, the opening 152 may have a circular shape. In other embodiments, the opening 152 may have any suitable shape.

Referring specifically to FIG. 9, the spring assembly 154 may include a biasing element 156 in a partially expanded position (e.g., positively displaced from an equilibrium position such that a radially outward spring force is generated). The spring assembly 154 may include first connection loop 196, a second connection loop 198, and the biasing element 156 may extend between the first connection loop 196 and the second connection loop 198. The first connection loop 196 may be disposed at a first end 178 of the biasing element 156, and the second connection loop 198 may be disposed at the second end 180 of the biasing element 156. The first connection loop 196 may couple the biasing element 156 to the seal assembly 106 at a first end 190 of the lift channel 150, and the second connection loop 198 may couple the biasing element 156 to the piston element 158. For example, the second connection loop 198 may couple to a radially outer surface 186 of the piston element 158 around a perimeter of the piston element 158.

Referring specifically to FIG. 10, the spring assembly 154 may include one or more biasing elements 156 in a partially compressed position (e.g., negatively displaced from an equilibrium position such that a radially outward spring force is generated). Particularly, the spring assembly 154 may include a first biasing element 161 and a second biasing element 163 each extending from a first end 178 coupled to the radially inner surface 174 to a second end 180 coupled to the piston element 158 (e.g., a radially inner surface 188 of the piston element 158). The first biasing element 161 may be disposed on an opposite side of the opening 152 (and/or opposite sides of the centerline 200) than the second biasing element 163, which advantageously equally distributes the spring forces on the piston element 158. The biasing elements 156 may be equally spaced apart with respect to the centerline 200 of the lift channel 150. For example, in embodiments having two biasing elements 156 (as shown in FIG. 10), the biasing elements 156 may be disposed 180° apart from one another with respect to the centerline 200. In embodiments having three biasing elements 156, the biasing elements 156 may be disposed 120° apart from one another with respect to the centerline 200.

In many embodiments, the spring assembly 154 may include one or more stoppers 182 disposed on the radially inner surface 174. The one or more stoppers 182 may ensure that the lift channel 150 remains in fluid communication with the fluid bearing by preventing the piston element 158 from moving beyond the stoppers 182 and sealing against the radially inner surface 174. As shown in FIGS. 9 and 10, the one or more stoppers 182 may include a first stopper 204 and a second stopper 206 disposed on opposite sides of the opening 152 from one another. The one or more stoppers 182 may be equally spaced apart from one another with respect to the centerline 200 of the lift channel 150. For example, in embodiments having two stoppers 182 (as shown), the stoppers 182 may be disposed 180° apart from one another with respect to the centerline 200. As another non-limiting example, in embodiments having three stoppers 182, the stoppers may be disposed 120° apart from one another with respect to the centerline 200. As shown in FIG. 10, the stoppers 182 may be spaced apart from the biasing elements 156 by between about 80° and about 100°. Additionally, While FIGS. 9 and 10 illustrate embodiments having two stoppers 182, the spring assembly 154 may include any number of stoppers 182, and the present spring assembly 154 should not be limited to any particular number of stoppers 182 unless specifically recited in the claims.

The biasing element 156 may be one or more linear springs, torsional springs, mechanical springs, helical springs, wave springs, or other spring that may elastically deform and store mechanical energy as a result of such deformation. In exemplary embodiments, as shown, the biasing element is one or more linear springs oriented along the radial direction R of the gas turbine engine 10. In such embodiments, the linear springs deform or displace along the radial direction to generate a radially oriented spring force. For example, in the embodiment shown in FIG. 9, the biasing element 156 is a singular linear spring oriented along the radial direction R and extending around the centerline 200 of the lift channel 150. In the embodiment shown in FIG. 10, the biasing element 156 includes two radially oriented linear springs disposed on opposite sides of the opening 152. In many embodiments, the biasing element 156 may be coaxial (e.g., share a common centerline) with the lift channel 150.

Figure 11:
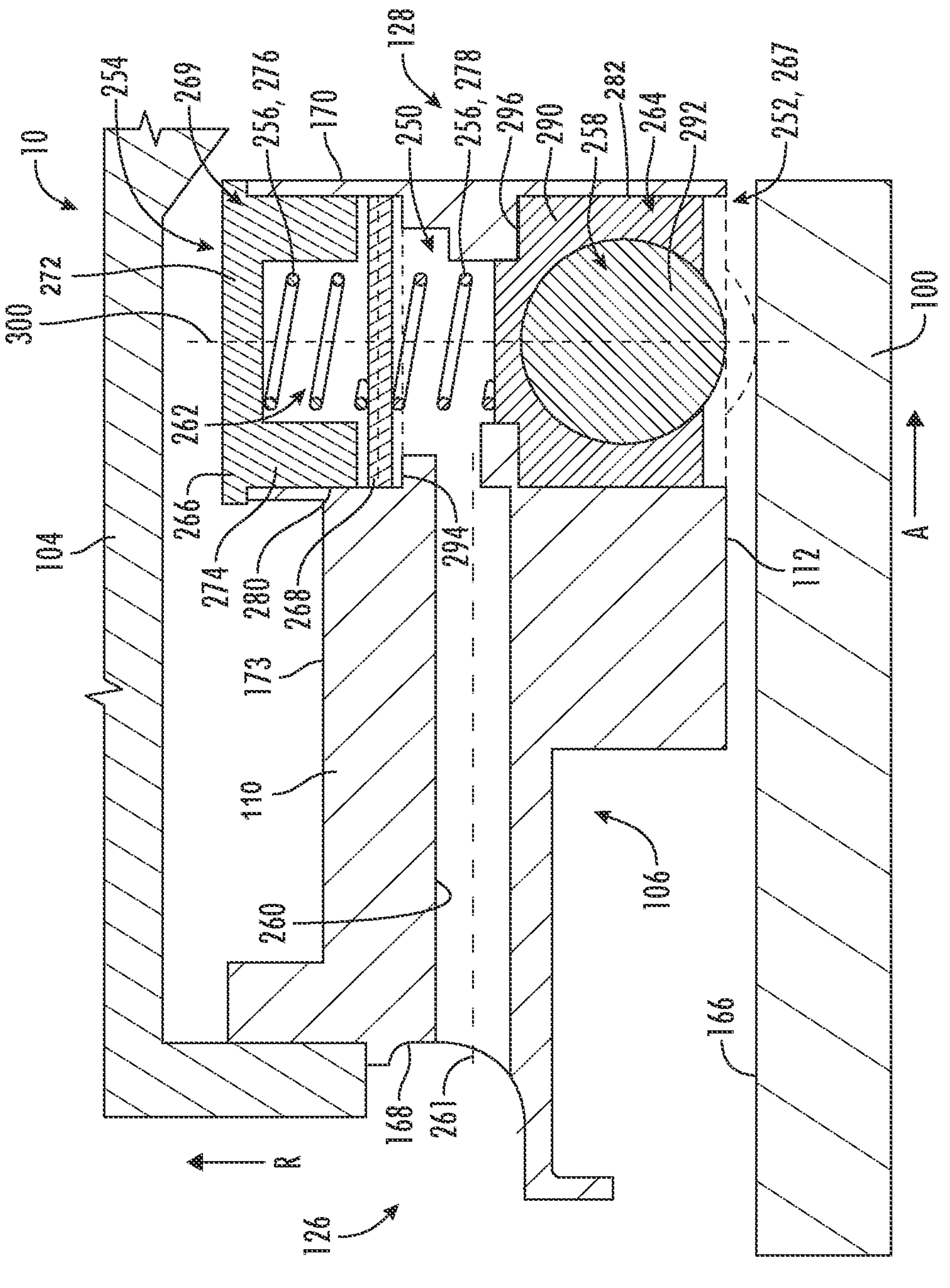
FIG. 11 illustrates an enlarged cross-sectional view of the turbine engine in accordance with embodiments of the present disclosure.

FIG. 11 illustrates an enlarged cross-sectional view of the gas turbine engine 10 in accordance with embodiments of the present disclosure. As shown, the gas turbine engine 10 includes a rotor 100, a stator 102 having a carrier 104, a seal assembly 106 disposed between the rotor 100 and the stator 102. The seal assembly 106 includes a seal segment 110 (e.g., the seal segment 110 of the plurality of seal segments 110 shown in FIGS. 2 and 4). The seal segment 110 include a seal face 112 configured to form a fluid bearing with the rotor 100. For example, a radial gap 165 may be defined between the seal face 112 and a radially outer surface 166 of the rotor 100, and the fluid bearing may be disposed within the radial gap 165.

Additionally, the seal segment 110 defines a lift channel 250 that extends within the seal segment 110 from an opening 252 on the seal face 112. A spring assembly 254 may be disposed within the lift channel 250, and the spring assembly 254 may include a biasing element 256 and a ball module 258. The ball module 258 may be movable within the lift channel 250 between a first position (shown in phantom) in which the ball module 258 protrudes from the seal face 112 into the fluid bearing and a second position (shown in solid lines) in which the ball module 258 is entirely within the lift channel 250.

The seal assembly 106 defines a high-pressure side 126 and a low-pressure side 128. The high-pressure side 126 may be located forward of the low-pressure side 128. The seal assembly 106 is operable to prevent or minimize an airflow from the high-pressure side 126 to the low-pressure side 128 between the rotor 100 and the seal assembly 106. In many embodiments, an inlet channel 260 may be defined in the seal segment 110, and the lift channel 250 may extend from the inlet channel 260. The inlet channel 260 may be fluidly coupled to the high-pressure side 126 and the lift channel 250. That is, the inlet channel 260 may extend (e.g., generally axially) from an inlet disposed on the forward surface 168 of the seal segment 110 to an outlet fluidly coupled to the lift channel 250.

In exemplary embodiments, the lift channel 250 may extend generally (e.g., radially inward and radially outward) from the inlet channel 260. The lift channel 250 may extend generally radially along a centerline 300. The centerline 300 may be aligned with the radial direction R of the gas turbine engine 10. As shown, the lift channel 250 may include a first portion 262 radially outward of the inlet channel 260 and a second portion 264 radially inward of the inlet channel 260. Particularly, the inlet channel 260 may extend along a centerline 261. The first portion 262 of the lift channel 250 may be disposed radially outward of the centerline 261 of the inlet channel 260, and the second portion 264 of the lift channel 250 may be disposed radially inward of the centerline 261 of the inlet channel 260. In various embodiments, as shown in FIG. 11, the opening 252 may be a first opening 267 defined on the seal face 112, and the lift channel 250 may further include a second opening 269 defined on the radially outer surface 173 of the seal segment 110. The first portion 262 of the lift channel 250 may be disposed radially between the centerline 261 and the second opening 269, and the second portion 264 of the lift channel 250 may be disposed radially between the centerline 261 and the first opening 267.

In many embodiments, a cap 266 and a plunger 268 are disposed within the first portion 262 of the lift channel 250. The cap 266 may extend within the first portion 262 and couple to the seal segment 110. Particularly, the cap 266 may threadably couple to the seal segment 110 For example, the cap 266 may include a top portion 272 and an annular side portion 274 extending (e.g., generally perpendicularly) from the top portion 272. The annular side portion 274 may define exterior threads that couple to interior threads defined in the seal segment 110 within the first portion 262 of the lift channel 250. The plunger 268 may be a generally flat plate that is radially movable within the first portion 262 of the lift channel 250. Particularly, the plunger 268 may be slidably movable within the first portion 262 of the lift channel 250, such that the plunger 268 contacts a boundary surface of the lift channel 250.

As shown in FIG. 11, the biasing element 256 may be a first biasing element 276 extending (generally radially) between the cap 266 and the plunger 268, and the spring assembly 254 may further include a second biasing element 278 extending (generally radially) between the plunger 268 and the ball module 258. The first biasing element 276 and the second biasing element 278 may be linear springs oriented along the radial direction R of the gas turbine engine 10. In such embodiments, the linear springs may deform or displace along the radial direction R to generate a radially oriented spring force. In many embodiments, the first biasing element 276, the second biasing element 278, and the lift channel 250 are coaxial (e.g., share a common centerline 300).

In many embodiments, the first portion 262 of the lift channel 250 are defined at least partially by a first annular wall 280, and the second portion 264 of the lift channel 250 may be at least partially defined by a second annular wall 282. In exemplary embodiments, a first annular step 294 may extend towards the centerline 300 of the lift channel 250. That is, the first annular step 294 may extend from the first annular wall 280 towards the centerline 300 of the lift channel 250. Additionally, a second annular step 296 may extend towards the centerline 300 of the lift channel 250. The second annular step 296 may extend from the second annular wall 282 towards the centerline 300 of the lift channel 250.

In various embodiments, the ball module 258 may include a ball sleeve 290 (or ball race) and a ball member 292 disposed within the ball sleeve 290. The ball member 292 may be spherically shaped. The ball member 292 may be rotatably movable within the ball sleeve 290 but may translate radially with the ball sleeve 290 between the first position and the second position. When the ball module 258 is in the first position (as shown by the phantom lines) a radially inner surface of the ball sleeve 290 may be flush with the seal face 112, and the ball member 292 may protrude radially outward from the seal face 112 into the The ball module 258 may be movable between a first position (shown in phantom) in which the ball module 258 protrudes from the seal face 112 into the fluid bearing and a second position (shown in solid lines) in which the ball module 258 is entirely within the lift channel 250. The plunger 268 may be movable (e.g., radially movable) between the first annular step 294 and the cap 266 (particularly the annular side portion 274 of the cap 266) to actuate the ball module 258 between the first position and the second position. For example, when the ball module 258 is in the first position (e.g., during start-up of the gas turbine engine 10 or other low pressure conditions), the ball module 258 may be in contact with the rotor 100, and the plunger may be in contact with the first annular step 294. As the pressure builds in the high-pressure side 126, the plunger 268 may be forced radially outward away from the first annular step 294, which in turn moves the ball module 258 radially outward from the first position to the second position. As shown, the ball module 258 may contact the second annular step 296 in the second position and be located entirely within the lift channel 250. Particularly, the ball sleeve 290 may contact the second annular step 296 in the second position.

The radially movable ball module 258 may advantageously prevent wear between the rotor 100 and the seal face 112 in certain operating conditions of the gas turbine engine 10. For example, during start up or assembly conditions of the gas turbine engine 10, the ball member 292 may contact the rotor 100 to prevent wear on the seal face 112. When the pressure builds on the high-pressure side 126, the plunger may move radially outwardly, and the ball module 258 may retract radially outwardly into the lift channel 250.

Figure 12:
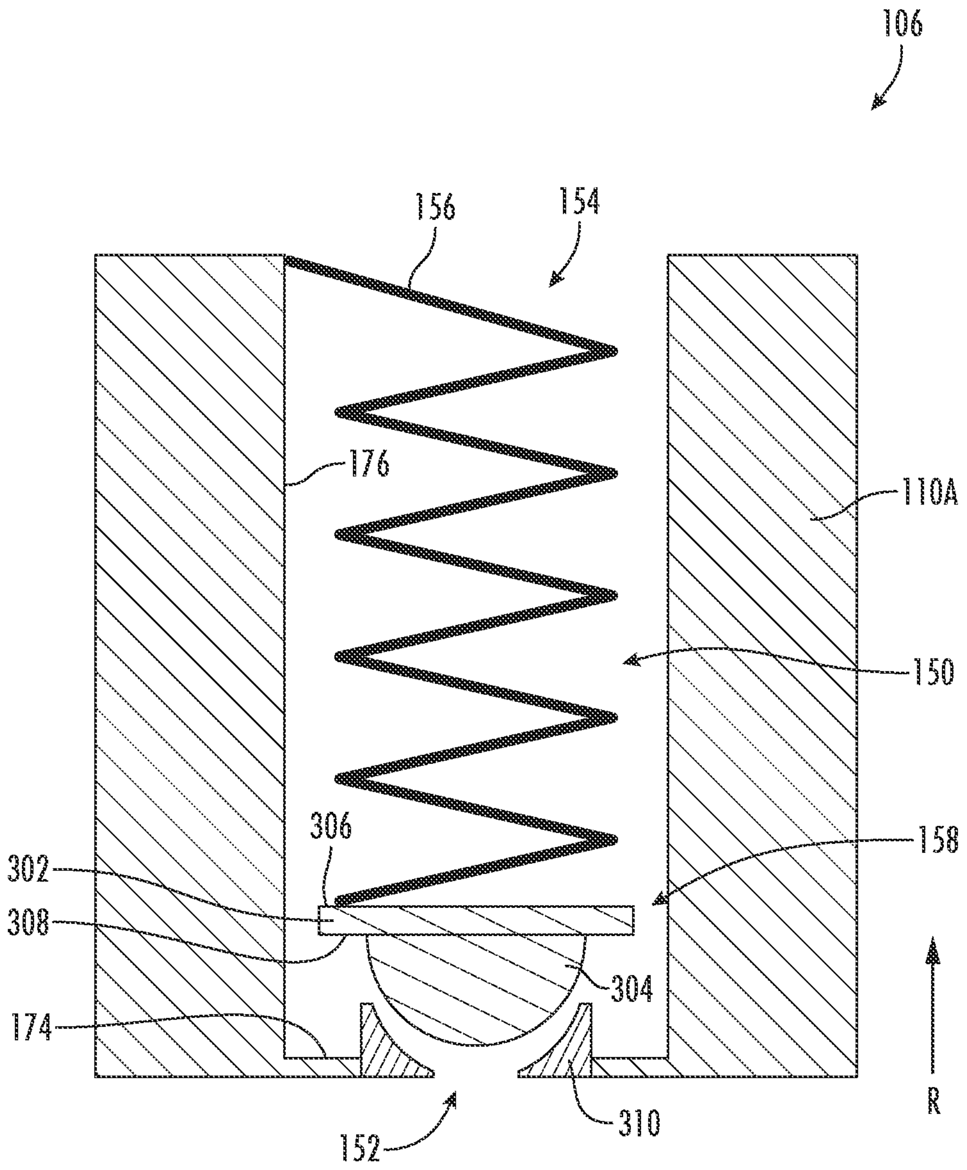
FIG. 12 illustrates a cross-sectional view of a seal assembly in accordance with embodiments of the present disclosure.

Referring now to FIG. 12, a cross-sectional view of a seal assembly 106 in accordance with embodiments of the present disclosure. As shown, the seal assembly includes the seal segment 110. The seal segment 110 defines a lift channel 150 that extends within the seal segment 110 from an opening 152 on the seal face 112. A spring assembly 154 may be disposed within the lift channel 150, and the spring assembly 154 may include a biasing element 156 and a piston element 158. The biasing element 156 (e.g., a mechanical spring, helical spring, or other spring) may be coupled to the seal segment 110 at a first end and coupled to the piston element 158 at the second end. the lift channel 150 may extend between a radially inner surface 174 and an annular side surface 176. For example, the lift channel 150 may be generally shaped as a cylinder, which may be collectively bound by the radially inner surface 174 and the annular side surface 176.

As shown in FIG. 12, in many embodiments, the piston element 158 includes a plate portion 302 and a round portion 304 coupled to the plate portion 302. The plate portion 302 may include a first side or radially outer side 306 and a second side or radially inner side 308. The radially outer side 306 may be coupled to the biasing element 156, and the radially inner side 308 may be coupled to the round portion 304. The round portion 304 may be at least partially spherically shaped, at least partially elliptically shaped, or other suitable round shapes. For example, in exemplary implementations, as shown, the round portion 304 may be shaped as a hemisphere.

In such embodiments, the seal assembly 106 further includes a race 310 positioned in the opening 152 and coupled to the seal segment 110. The round portion 304 may correspond in size and shape with the race 310, such that the round portion 304 of the piston element may be seated on the race 310 during low pressure conditions. In some embodiments (not shown), the race 310 may be integrally formed with the seal segment 110. The race 310 may be shaped to correspond with the round portion 304, such that the round portion 304 may be seated in flush contact on the race 310 in low pressure conditions when the biasing element 156 is fully extended.

Figure 13:
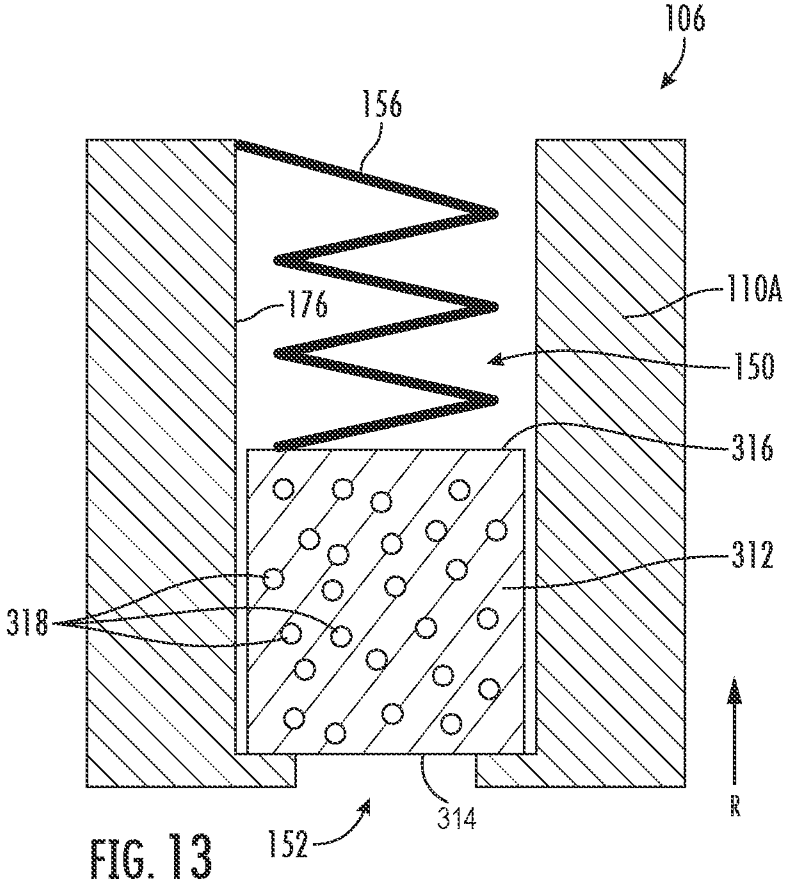
FIG. 13 illustrates a cross-sectional view of a seal assembly in accordance with embodiments of the present disclosure.
Figure 14:
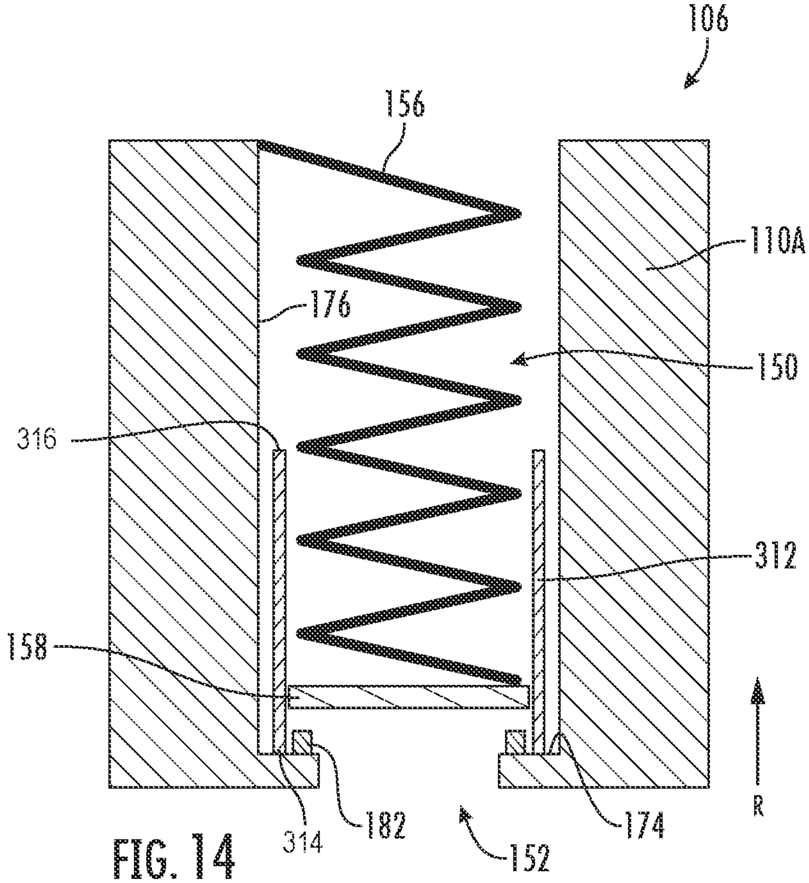
FIG. 14 illustrates a cross-sectional view of a seal assembly in accordance with embodiments of the present disclosure.

Referring now to FIGS. 13 and 14, two different cross-sectional views of a seal assembly 106 are illustrated in accordance with an embodiment of the present disclosure. Particularly, FIG. 13 is a cross-sectional view of a seal assembly 106 having cylinder 312 that defines a plurality of perforations 318, in which an exterior of the cylinder 312 is shown. FIG. 14 is a cross-sectional view of the seal assembly 106 shown in FIG. 13, in which the cylinder 312 is also cut away to illustrate how the spring assembly 154 interfaces with the cylinder 312. As shown, the seal assembly 106 includes the seal segment 110. The seal segment 110 defines a lift channel 150 that extends within the seal segment 110 from an opening 152 on the seal face 112. A spring assembly 154 and the cylinder 312 may be disposed within the lift channel 150. The spring assembly 154 may include a biasing element 156 and a piston element 158. The biasing element 156 (e.g., a mechanical spring, helical spring, or other spring) may be coupled to the seal segment 110 at a first end and coupled to the piston element 158 at the second end. the lift channel 150 may extend between a radially inner surface 174 and an annular side surface 176. For example, the lift channel 150 may be generally shaped as a cylinder, which may be collectively bound by the radially inner surface 174 and the annular side surface 176.

In many embodiments, the cylinder 312 is disposed in the lift channel 150 and at least partially surrounds the spring assembly 154. The cylinder 312 may be a hollow cylinder that is positioned within the lift channel 150 and partially surrounds the spring assembly 154. The plurality of perforations 318 may provide for fluid communication between the fluid bearing and the lift channel 150. The plurality of perforations 318 may be randomly arranged or arranged in a pattern on the cylinder 312. The plurality of perforations may each be shaped as a circle or other suitable shape. The cylinder 312 may extend from a first end 314 coupled to the radially inner surface 174 to a second end 316 within the lift channel 150. The cylinder 312 may surround at least a portion of the biasing element 156, and the cylinder 312 may surround the piston element 158. For example, the piston element 158 may be radially movable within the cylinder 312 between the stoppers 182 and the second end 316 of the cylinder 312. The cylinder 312 having the plurality of perforations 318 may advantageously meter the flow between the lift channel 150 and the fluid bearing to provide the desired amount of lift force on the seal segment 110 during operation of the gas turbine engine.

The lift assemblies disclosed herein may advantageously prolong the hardware life of the seal assembly by preventing contact between the seal segments and the rotor. For example, biasing element may expand/retract due to pressure differences across the plate or ball, thereby varying the volume of the lift channel and adjusting the lift force on the seal segment. As the gap between the rotor and the stator reduces, the pressure within the gap will increase, which causes the plate move in radial outward direction and thus increasing the volume of the lift channel. In turn, more air is forced into the lift channel which creates a greater lift force on the seal member that prevents seal member/rotor rubs, thereby prolonging the hardware life of the sealing assembly by preventing wear.

Further aspects are provided by the subject matter of the following clauses:

A turbine engine comprising: a rotor; a stator; a seal assembly disposed between the rotor and the stator, the seal assembly comprising a seal segment, the seal segment having a seal face configured to form a fluid bearing with the rotor, wherein a lift channel extends within the seal segment from an opening on the seal face; and a spring assembly disposed within the lift channel, the spring assembly including a biasing element and a piston element coupled to the biasing element, wherein the lift channel includes a lift volume portion extending between the opening and the piston element, and wherein the piston element is movable within the lift channel based on a pressure within the fluid bearing to adjust a size of the lift volume portion.

The turbine engine of any of the preceding clauses, wherein the lift channel extends between a radially inner surface and an annular side surface.

The turbine engine of any of the preceding clauses, wherein the biasing element extends between a first end coupled to the annular side surface and a second end coupled to the piston element.

The turbine engine of any of the preceding clauses, wherein the biasing element extends between a first end coupled to the radially inner surface and the piston element.

The turbine engine of any of the preceding clauses, further comprising one or more stoppers disposed on the radially inner surface.

The turbine engine of any of the preceding clauses, wherein the piston element is a flat plate.

The turbine engine of any of the preceding clauses, wherein the biasing element is a linear spring oriented along a radial direction of the turbine engine.

The turbine engine of any of the preceding clauses, further comprising a feeding port defined in the seal segment, and wherein the lift channel extends from the feeding port to the opening.

The turbine engine of any of the preceding clauses, wherein the seal assembly comprises a race positioned in the opening, and wherein the piston element includes a plate portion and a round portion configured to be seated in the race.

The turbine engine of any of the preceding clauses, wherein the seal assembly comprises a cylinder disposed in the lift channel and at least partially surrounding the spring assembly, the cylinder defining a plurality of perforations.

A turbine engine comprising: a rotor; a stator; a seal assembly disposed between the rotor and the stator, the seal assembly comprising a seal segment, the seal segment having a seal face configured to form a fluid bearing with the rotor, wherein a lift channel extends within the seal segment from an opening on the seal face; and a spring assembly disposed within the lift channel, the spring assembly including a biasing element and a ball module, the ball module movable within the lift channel between a first position in which the ball module protrudes from the seal face into the fluid bearing and a second position in which the ball module is entirely within the lift channel.

The turbine engine of any of the preceding clauses, wherein the seal assembly includes a high-pressure side and a low-pressure side, and wherein the high-pressure side is located forward of the low-pressure side.

The turbine engine of any of the preceding clauses, further comprising an inlet channel defined in the seal segment, wherein the lift channel extends from the inlet channel.

The turbine engine of any of the preceding clauses, wherein the lift channel extends generally radially from the inlet channel, and wherein the lift channel includes a first portion radially outward of the inlet channel and a second portion radially inward of the inlet channel.

The turbine engine of any of the preceding clauses, further comprising a cap and a plunger disposed within the first portion of the lift channel.

The turbine engine of any of the preceding clauses, wherein the cap is threadably coupled to the seal segment.

The turbine engine of any of the preceding clauses, wherein the biasing element is a first biasing element extending between the cap and the plunger, and wherein the spring assembly further comprises a second biasing element extending between the plunger and the ball module.

The turbine engine of any of the preceding clauses, wherein a first annular step extends towards a centerline of the lift channel, and wherein the plunger is movable between the first annular step and the cap.

The turbine engine of any of the preceding clauses, wherein a second annular step extends towards a centerline of the lift channel, and wherein the ball module contacts the second annular step in the second position.

The turbine engine of any of the preceding clauses, wherein the ball module includes a ball sleeve and a ball member disposed within the ball sleeve.

A sealing arrangement comprising: a rotating component; a stationary component; a seal assembly disposed between the rotating component and the stationary component, the seal assembly having a seal face configured to form a fluid bearing with the rotating component, wherein a lift channel is defined within the seal assembly and extends from an opening on the seal face; and a spring assembly disposed within the lift channel, the spring assembly including a biasing element and a piston element coupled to the biasing element, wherein the lift channel includes a lift volume portion extending is between the opening and the piston element, and wherein the piston element is movable within the lift channel based on a pressure within the fluid bearing to adjust a size of the lift volume portion.

The turbine engine of any of the preceding clauses, wherein movement of the piston element within the lift channel may be described by the following equations:

$$P_{high}A = P_{FB}A + F_{spring} \tag{1}$$

$$F_{spring} = -kx \tag{2}$$

A sealing arrangement comprising: a rotating component; a stationary component; a seal assembly disposed between the rotating component and the stationary component, the seal assembly having a seal face configured to form a fluid bearing with the rotating component, wherein a lift channel is defined within the seal assembly and extends from an opening on the seal face; and a spring assembly disposed within the lift channel, the spring assembly including a biasing element and a ball module, the ball module movable within the lift channel between a first position in which the ball module protrudes from the seal face into the fluid bearing and a second position in which the ball module is entirely within the lift channel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine comprising:

a rotor;

a stator;

a seal assembly disposed between the rotor and the stator, the seal assembly comprising a seal segment, the seal segment having a seal face configured to form a fluid bearing with the rotor, wherein a lift channel extends within the seal segment from an opening on the seal face; and a spring assembly disposed within the lift channel, the spring assembly including a biasing element and a piston element coupled to the biasing element, wherein the lift channel includes a lift volume portion extending between the opening and the piston element, and wherein the piston element is movable within the lift channel based on a pressure within the fluid bearing to adjust a size of the lift volume portion, wherein the lift channel extends between a radially inner surface and an annular side surface, and wherein the biasing element extends between a first end coupled to the annular side surface and a second end coupled to the piston element.

2. The turbine engine of claim 1, wherein the biasing element extends between a first end coupled to the radially inner surface and the piston element.

3. The turbine engine of claim 1, further comprising one or more stoppers disposed on the radially inner surface.

4. The turbine engine of claim 1, wherein the piston element is a flat plate.

5. The turbine engine of claim 1, wherein the biasing element is a linear spring oriented along a radial direction of the turbine engine.

* * * * *